US006985697B2

(12) United States Patent
Smith et al.

(10) Patent No.: US 6,985,697 B2
(45) Date of Patent: Jan. 10, 2006

(54) METHOD AND SYSTEM FOR WIRELESSLY MANAGING THE OPERATION OF A NETWORK APPLIANCE OVER A LIMITED DISTANCE

(75) Inventors: Gregory J Smith, Santa Clara, CA (US); Robert Paxton Scott, Sunnyvale, CA (US)

(73) Assignee: Nokia, Inc., Irving, TX (US)

( * ) Notice: Subject to any disclaimer, the term of this patent is extended or adjusted under 35 U.S.C. 154(b) by 121 days.

(21) Appl. No.: 10/668,054

(22) Filed: Sep. 22, 2003

(65) Prior Publication Data

US 2005/0064816 A1  Mar. 24, 2005

(51) Int. Cl.
*H04B 7/00* (2006.01)
(52) U.S. Cl. .................. 455/41.2; 455/414.1; 455/461; 455/426.1; 455/432.2; 455/435.1; 370/338; 370/349; 370/352; 709/227; 709/224; 709/250
(58) Field of Classification Search ............... 455/41.2, 455/414.1, 461, 426.1, 435.1, 432.2; 370/338, 370/349, 352
See application file for complete search history.

(56) References Cited

U.S. PATENT DOCUMENTS

| | | | | |
|---|---|---|---|---|
| 5,958,018 A | * | 9/1999 | Eng et al. .................... 709/246 |
| 6,021,324 A | * | 2/2000 | Sizer et al. .................. 455/403 |
| 6,141,347 A | * | 10/2000 | Shaughnessy et al. ...... 370/390 |
| 6,167,253 A | * | 12/2000 | Farris et al. .............. 455/412.2 |
| 6,198,728 B1 | * | 3/2001 | Hulyalkar et al. ........ 370/310.1 |
| 6,223,046 B1 | * | 4/2001 | Hamill-Keays et al. ..... 455/512 |
| 6,498,939 B1 | * | 12/2002 | Thomas .................... 455/562.1 |
| 6,542,740 B1 | * | 4/2003 | Olgaard et al. ........... 455/432.1 |
| 6,658,011 B1 | * | 12/2003 | Sevanto et al. ............. 370/401 |
| 6,759,946 B2 | * | 7/2004 | Sahinoglu et al. ..... 340/310.01 |
| 6,847,610 B1 | * | 1/2005 | Suumaki et al. ......... 370/230.1 |
| 6,857,021 B1 | * | 2/2005 | Schuster et al. ............ 709/227 |

* cited by examiner

*Primary Examiner*—Marceau Milord
(74) *Attorney, Agent, or Firm*—Darby & Darby P.C.

(57) ABSTRACT

A wireless communication interface in a network appliance that enables secure wireless management of the network appliance over a relatively limited (short) distance with a mobile node. The operator of the mobile node is authenticated and communication between the network appliance and the mobile node is encrypted. Even if an unauthorized person was able to be positioned in relatively close proximity to a network appliance such as within the physical confines of a data center, these authentication and encryption measures would make it extremely difficult for unauthorized wireless management of the operation of the network appliance.

21 Claims, 4 Drawing Sheets

METHOD AND SYSTEM FOR WIRELESSLY MANAGING THE OPERATION OF A NETWORK APPLIANCE OVER A LIMITED DISTANCE

FIELD OF THE INVENTION

The present invention relates to managing the operation of an appliance on a network, and more particularly to employing a secure wireless connection with relatively limited range to facilitate the management of the appliance.

BACKGROUND OF THE INVENTION

Network appliances such as routers, hubs, firewalls, file servers, and the like, are often disposed in a physical location such as a data center where access is typically restricted to authorized personnel. To increase the number of network appliances that can be located in a data center, several network appliances may be positioned in a vertical rack and several of these racks are often disposed in the data center. Also, a cable that is directly connected to some computing device such as a desktop computer or a notebook computer or a wired network interface such as Ethernet is typically employed for configuring and/or managing the operation of each network appliance.

Additionally, since physical access in a data center to a network appliance is often difficult due to space constraints, it is often difficult to identify a particular network appliance and install a separate cable for configuring and/or managing its operation.

DETAILED DESCRIPTION OF THE PREFERRED EMBODIMENT

Figure 1:
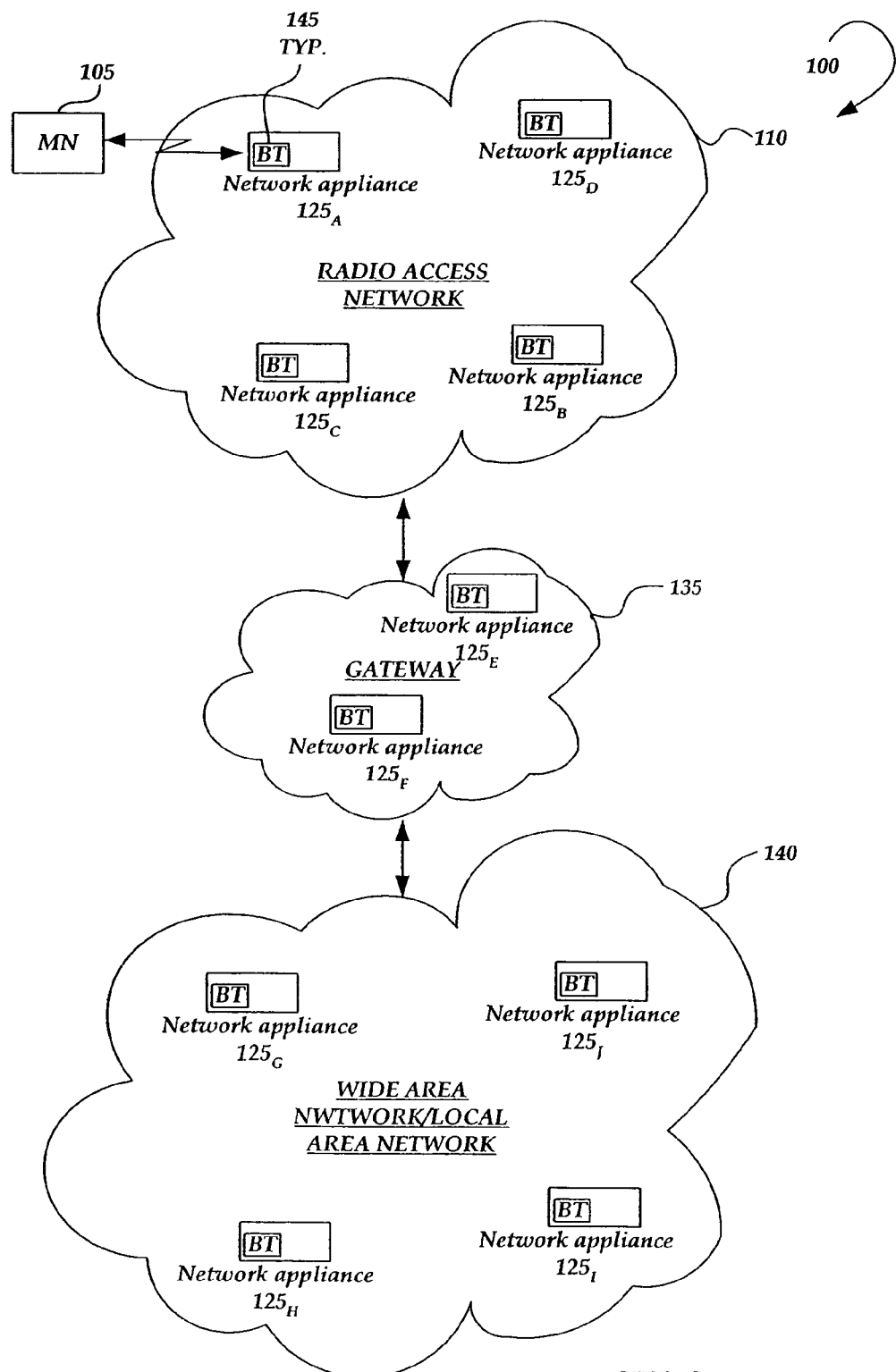
FIG. 1 illustrates a schematic diagram of an exemplary system for enabling a mobile node to wirelessly communicate with network appliances.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "packet" refers to an IP packet. The term "flow" means a flow of packets. The term "connection" refers to a flow or flows of packets that share a common path. The term "node" refers to a network element that interconnects one or more networks or devices. The term "user" refers to any person or customer such as a business or organization that employs a device to communicate or access resources over a network. The term "operator" refers to any technician or organization that maintains or services a packet-based network.

The term "network appliance" means a computing device that is coupled to a network and is designed to perform at least one function relating to the network. Exemplary network appliances include, but are not limited to, routers, switches, firewalls, content filters, file servers, network traffic load balancers, hubs, and the like.

The term "router" refers to a dedicated network element that receives packets and forwards them to their destination. In particular, a router is used to extend or segment networks by forwarding packets from one logical network to another. A router typically operates at layer 3 and below of the Open Systems Interconnection (OSI) reference model for networking. However, some routers can provide additional functionality that operates above layer 3 of the OSI reference model.

The term "core network" refers to any packet switched digital network. For example, Frame Relay, Asynchronous Transfer Mode (ATM) and Switched Megabit Data Service, and the like.

Referring to the drawings, like numbers indicate like parts throughout the views. Additionally, a reference to the singular includes a reference to the plural unless otherwise stated or is inconsistent with the disclosure herein.

A method, apparatus and system is provided for providing a communication interface in a network appliance that enables secure wireless management of the network appliance over a relatively limited (short) distance with a mobile node. The operator of the mobile node is authenticated and communication between the network appliance and the mobile node is encrypted. Even if an unauthorized person was able to be positioned in relatively close proximity to a network appliance such as within the physical confines of a data center, these authentication and encryption measures would make it extremely difficult for unauthorized wireless management of the operation of the network appliance.

It is understood that managing the operation of a network appliance can include one or more actions including, but not limited to, configuration, load balancing, IP address assignment, metrics, updates, maintenance, security, and the like.

In one embodiment, the exemplary communication interface enables communication between a network appliance and a computing device with a secure and relatively low power wireless communication protocol, such as provided by the Bluetooth specification.

Bluetooth is a specification for using low-power radio to link mobile devices and computers over short distances without wires. The name "Bluetooth" is borrowed from Harald Bluetooth, who was a king in Denmark more than 1,000 years ago. The name was chosen in part to reflect the relatively important role that Scandinavian countries play in the wireless communication industry.

Bluetooth devices establish a network that uses a dynamic topology called a piconet or personal area network (PAN) for sharing a common communication channel with a total capacity of 1 megabit per second. Each piconet can include a minimum of two and a maximum of eight Bluetooth peer devices. Bluetooth technology uses low power (1 milliwatt) to transmit radio signals over a relatively short distance, typically no more than 30 feet (10 meters). By comparison, many mobile telephones transmit a radio signal at three watts.

The Bluetooth specification, developed by an industry consortium, specifies spread spectrum frequency hopping in the 2.4 Giga hertz range for radio signals, the same range used by the IEEE 802.11b protocol. However, even with relatively low power, a Bluetooth signal can still enable communication between several devices in different rooms that are physically positioned no more than 10 meters away from each other.

Bluetooth provides link-layer encryption and can establish an encrypted link between two Bluetooth devices. Bluetooth can establish link encryption between two devices when a symmetric encryption key is created in both of them. This process, called pairing, uses a shared secret known as a PIN that is passed out-of-band, as opposed to over a Bluetooth channel. The shared symmetric encryption keys are then created and exchanged in a secure manner with the use of the PIN. This pairing process can be classified as a key-management or a key-exchange mechanism.

Bluetooth authentication verifies that the other device has the same encryption key before enabling encryption on the connection. This is a connection-management issue designed to prevent the confusion that would result if the nodes on the connection used different encryption keys.

Illustrative Operating Environment

With reference to FIG. 1, an exemplary network system in which the invention may operate is illustrated. As shown in the figure, exemplary network system 100 includes mobile node (MN) 105, radio access network (RAN) 110, gateway 135, network appliance $125_{A-J}$ and wide area network (WAN)/local area network (LAN) 140. Typically, the network appliances for RAN 110, gateway 135 and WAN 140 would be disposed in one or more data centers where proximity and access to their respective network appliances would be limited to authorized personnel, such as system administrators, technicians, and the like.

Mobile node 105 is arranged to enable wireless communication with each network appliance that includes a wireless module (BT) 145. Each BT 145 is arranged to support a secure wireless protocol that enables communication over a relatively short distance, such as the Bluetooth protocol, and the like. Due in part to this relatively limited distance and restricted access to a typical data center, mobile node 105 wirelessly communicates with a network appliance from a position either within the data center or in a secure area that is known to the operator of the data center. Also, the limited distance/range for wirelessly communicating with the network appliance doesn't prevent authorized personnel from wireless communicating with a network appliance, but it can prevent an unauthorized person that is positioned outside the data center from doing so.

Generally, MN 105 may include any device capable of communicating with BT 145. Such devices include cellular telephones, smart phones, pagers, radio frequency (RF) communication devices, integrated devices combining one or more of the preceding devices, and the like. MN 105 may also include other devices that have a wireless interface such as Personal Digital Assistants (PDAs), handheld computers, personal computers, multiprocessor systems, microprocessor-based or programmable consumer electronics, network PCs, wearable computers, and the like.

RAN 110 may include both wireless and wired components. For example, RAN 110 may include a cellular tower that is linked to a wired telephone network. Typically, the cellular tower carries communication to and from cell phones, pagers, and other wireless devices, and the wired telephone network carries communication to regular phones, long-distance communication links, and the like. RAN 110 may include network devices, such as network appliances $125_{A-D}$, as shown in the figure. Generally, at least because network appliances $125_{A-J}$ are coupled to a network, they are vulnerable to security breaches, such as invasion by unauthorized processes and management by unauthorized persons.

RAN 110 is coupled to WAN/LAN 140 through gateway 135. Gateway 135 routes information between RAN 110 and WAN/LAN 140. For example, a mobile node, such as MN 105, may request access to the Internet by calling a certain number or tuning to a particular frequency. Upon receipt of the request, RAN 110 is configured to pass information between MN 105 and gateway 135. Gateway 135 may translate requests from MN 105 to a specific protocol, such as hypertext transfer protocol (HTTP) messages, and then send the messages to WAN/LAN 140. Gateway 135 translates responses to such messages into a form compatible with the requesting mobile node. Gateway 135 may also transform other messages sent from MN 105 into information suitable for WAN/LAN 140, such as e-mail, audio, voice communication, contact databases, calendars, appointments, and the like. As shown in the figure, gateway 135 may include network devices, such as network appliances $125_{E-F}$ that include wireless module BT 145.

WAN/LAN 140 is an IP packet based backbone network that transmits information between computing devices. One example of WAN is the Internet. An example of a LAN is a network used to connect computers in an office or a home. A WAN may connect multiple LANs. As shown in the figure, WAN/LAN 140 may include network devices, such as network appliances $125_{G-J}$ that may also include wireless module BT 145.

Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links.

Network system 100 may include many more components than those shown in FIG. 1. However, the components shown are sufficient to disclose an illustrative embodiment for practicing the present invention.

The media used to transmit information in the communication links as described above illustrates one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
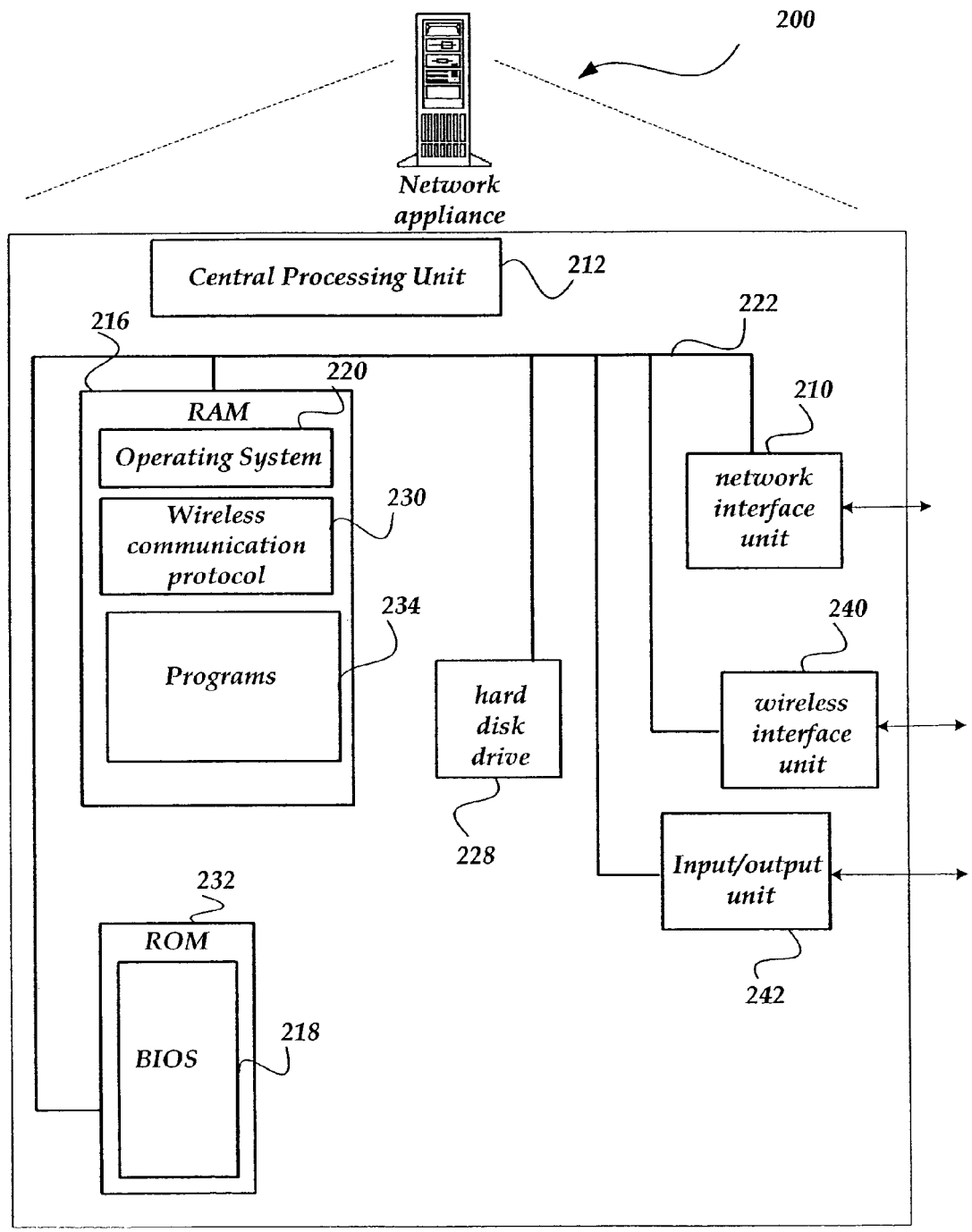
FIG. 2 shows a schematic diagram of an exemplary network appliance.

FIG. 2 illustrates a schematic diagram that shows an exemplary network appliance. Network appliance 200 may include many more components than those shown in FIG. 2. However, the components shown are sufficient to disclose an illustrative embodiment for practicing the present invention.

As shown in FIG. 2, network appliance 200 may be coupled to RAN 105 or WAN/LAN 140, or other communications network, via network interface unit 210. Network interface unit 210 includes the necessary circuitry and protocols for coupling network appliance 200 to RAN 105 or WAN/LAN 140. Typically, there is one network interface unit 210 provided for each network coupled to network appliance 200.

Network appliance 200 also includes processing unit 212, and a mass memory, all connected via bus 222. The mass memory generally includes RAM 216, ROM 232, and optionally, one or more permanent mass storage devices, such as hard disk drive 228, and/or a tape drive, CD-ROM/DVD-ROM drive, floppy disk drive, and the like. The mass memory stores operating system 220 for controlling the operation of network appliance 200. This component may comprise a general purpose operating system 220, or the operating system may be specialized to support the specific functions of network appliance 200. Additionally, input/output interface 242 enables wired devices to communicate with network appliance 200, such devices include, but are not limited to, keyboards, pointing devices, displays, printers, and the like. Furthermore, wireless communication unit 240 enables wireless communication over a limited distance with a mobile node (not shown).

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for wireless communication protocol 230, and other programs 234 such as programs that enable network appliance 200 to perform its functions. Wireless communication protocol program 230 enables network appliance 200 to securely employ wireless interface unit 240 for wireless communication over a relatively short distance with a mobile node (not shown).

Illustrative System Diagram

Figure 3:
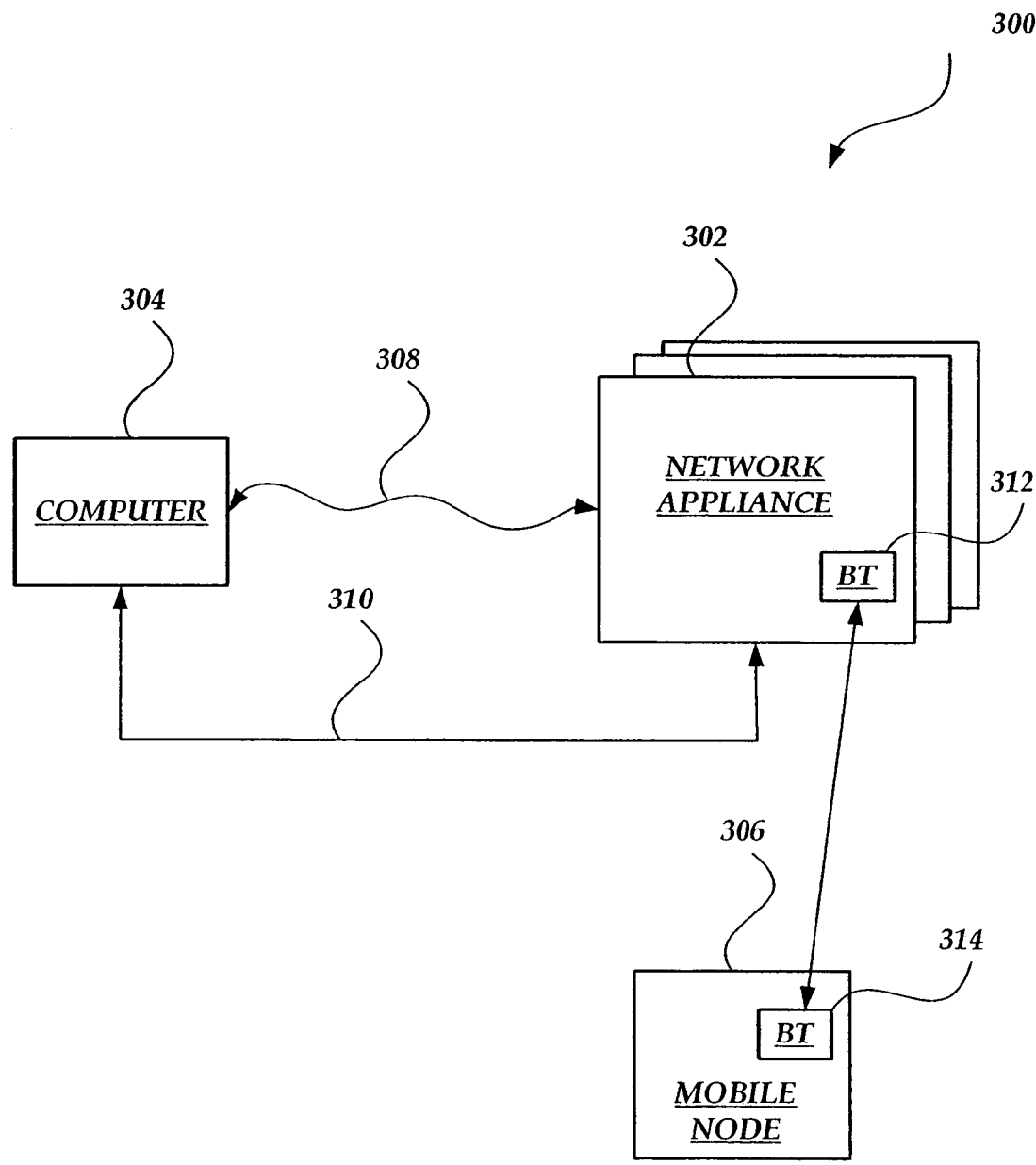
FIG. 3 shows a system diagram of exemplary communication paths between a network appliance and a computer and a mobile node.

FIG. 3 illustrates an over view 300 of an exemplary system where network appliance 302 is capable of communicating with computer 304 by two separate communication channels, network cable 310 and point to point cable 308. Typically, communication over network cable 310 is enabled by a protocol such as Ethernet and security is provided with a secure sockets layer (SSL), and the like. Also, multiple network appliances in a data center may be logically connected to network cable 310. Point to point cable 308 enables direct communication between computer 304 and network appliance 302 with at least one serial or parallel interface, including, but not limited to, USB, Firewire, RS 232, RS 485, IEEE 488, and the like.

As shown, mobile node 306 includes wireless interface unit (BT) 314 that can wirelessly communicate with wireless interface unit (BT) 312, which is included with network appliance 302. Mobile node 314 enables authorized personnel to wirelessly manage the operation of network appliance 302.

Illustrative Flow Diagram

Figure 4:
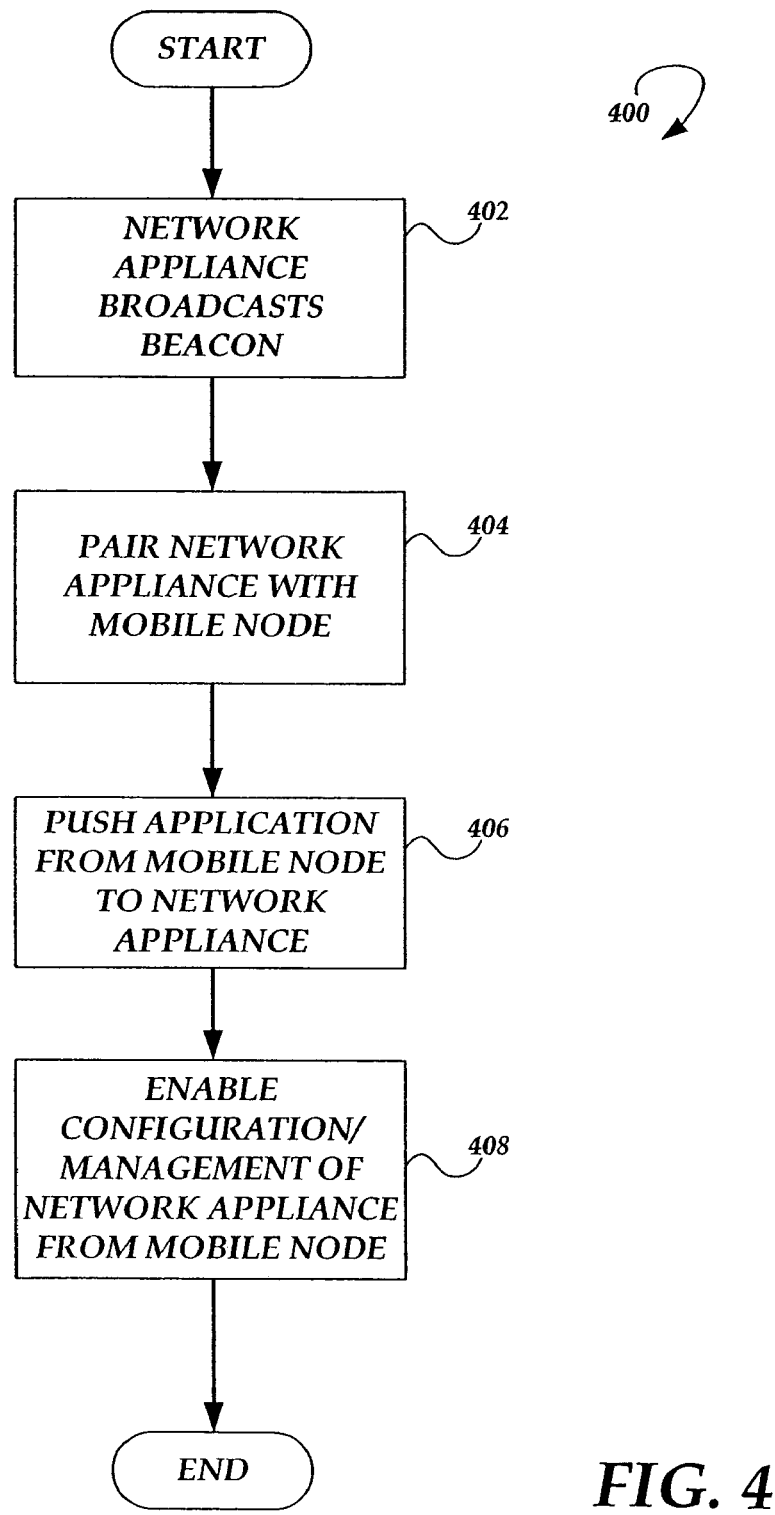
FIG. 4 shows a flow diagram, in accordance with the present invention.

FIG. 4 illustrates an exemplary flow chart for enabling a mobile node to wirelessly configure/manage the operation of a network appliance. Moving from a start block, the process advances to block 402 where the network appliance broadcasts a beacon over a relatively short distance, e.g., ten meters. The beacon broadcast may occur under various conditions, including, but not limited to, reset, error, maintenance, and the initial setup of the network appliance.

Moving to block 404, the network appliance pairs with the mobile node after determining that the mobile node is authenticated for wireless communication with the network appliance. In some cases, an initial code that was provided to the mobile node out of band such as the serial number of the network appliance may be used for authentication. At some later date, the system administrator could change this initial code to some other value.

Next, from the mobile node an application is pushed to the network appliance. The pushed application may be provided in various formats, including, but not limited to, a binary file, script, JAVA application, and the like. Once the application is installed on the network appliance, the process steps to block 408 where an authorized operator of the mobile node can employ an application to securely manage the operation of the network appliance over the paired wireless communication link.

In one embodiment, the network appliance may provide the mobile node with a profile that can include, but is not limited to, a location identification number, IP address, type of the network appliance, and the like. Additionally, the communication between the paired mobile node and network appliance is encrypted to further prevent unauthorized management of the network appliance. Also, the mobile node may provide an application such as a browser application, JAVA application, and the like, to control the application pushed to the network appliance. Next, the process advances to an end block and continues processing other actions.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for enabling management of a network appliance with a mobile node, comprising
    enabling the network appliance to provide a beacon, wherein the beacon is created by a radio signal that is generated with relatively low power;
    if the mobile node receives the beacon, enabling the mobile node to pair with the network appliance;
    if the mobile node is paired with the network appliance, pushing an application from the mobile node to the network appliance; and
    enabling the mobile node to wirelessly communicate at least one management operation to the pushed application over a relatively short distance, wherein the management operation is provided to the network appliance for execution.

2. The method of claim 1, wherein the pushed application is at least one of a JAVA application, binary file, and script.

3. The method of claim 1, wherein the radio signal is generated with approximately one milliwatt of power.

4. The method of claim 1, wherein the relatively short distance is approximately 10 meters.

5. The method of claim 1, wherein enabling the mobile node to wirelessly communicate with the network appliance, further comprises authenticating an operator of the mobile node.

6. The method of claim 1, wherein the wireless communication is based on a Bluetooth specification.

7. The method of claim 1, wherein the network appliance further comprises at least one of a router, switch, firewall, content filter, file server, load balancer, and hub.

8. The method of claim 1, wherein the mobile node further comprises at least one of a cellular telephone, smart phone, pager, radio frequency (RF) communication device, Personal Digital Assistant (PDA), handheld computer, laptop computer, personal computer, multiprocessor system, microprocessor-based consumer electronic device, programmable consumer device, network PC, and wearable computer.

9. The method of claim 1, wherein the managing of the operation of the network appliance further comprises providing at least one operation, including configuration, load balancing, IP address assignment, metric collection, metric analysis, updates, maintenance, and security measures.

10. A system for enabling management of a network appliance with a mobile node, comprising
 a first wireless interface that is included with the network appliance and enables the network appliance to provide a beacon, wherein the beacon is created by a radio signal that is generated with relatively low power;
 a second wireless interface that is included with the mobile node, wherein if the mobile node receives the beacon, the second wireless interface enables the mobile node to pair with the network appliance, and
 an application that is pushed from the mobile node to the network appliance, wherein the application enables the mobile node to wirelessly communicate at least one management operation over a relatively short distance to the network appliance, and wherein the management operation is provided to the network appliance for execution.

11. The system of claim 10, wherein the pushed application is at least one of a JAVA application, binary file, and script.

12. The system of claim 10, wherein enabling the mobile node to wirelessly communicate with the network appliance, further comprises authenticating an operator of the mobile node.

13. The system of claim 10, wherein the wireless communication is based on a Bluetooth specification.

14. The system of claim 10, wherein the managing of the operation of the network appliance further comprises providing at least one operation for execution, including configuration, load balancing, IP address assignment, metric collection, metric analysis, updates, maintenance, and security measures.

15. An apparatus for enabling management of a network appliance with a mobile node, comprising
 a wireless interface that is included with the network appliance and enables the network appliance to perform actions, including:
  providing a beacon, wherein the beacon is created by a radio signal that is generated with relatively low power;
  if the mobile node receives the beacon, enabling the mobile node to pair with the network appliance, and
  enabling an application that is pushed from the mobile node to be received by the network appliance, wherein the received application enables the mobile node to wirelessly communicate at least one management operation over a relatively short distance to the network appliance, and wherein the management operation is provided to the network appliance for execution.

16. The apparatus of claim 15, wherein the pushed application is at least one of a JAVA application, binary file, and script.

17. The apparatus of claim 15, wherein enabling the mobile node to wirelessly communicate with the network appliance, further comprises authenticating an operator of the mobile node.

18. The apparatus of claim 15, wherein the wireless communication is based on a Bluetooth specification.

19. The apparatus of claim 15, wherein the managing of the operation of the network appliance further comprises providing at least one operation for execution, including configuration, load balancing, IP address assignment, metric collection, metric analysis, updates, maintenance, and security measures.

20. A computer readable media, tangibly embodying instructions to perform actions, comprising:
 enabling a network appliance to provide a beacon, wherein the beacon is created by a radio signal that is generated with relatively low power;
 if a mobile node receives the beacon, enabling the mobile node to pair with the network appliance;
 if the mobile node is paired with the network appliance, means for pushing an application from the mobile node to the network appliance; and
 enabling the mobile node to wirelessly communicate at least one management operation to the pushed application over a relatively short distance, wherein the management operation is provided to the network appliance for execution.

21. A method for enabling management of a network appliance with a mobile node, comprising
 means for enabling the network appliance to provide a beacon, wherein the beacon is created by a radio signal that is generated with relatively low power;
 if the mobile node receives the beacon, means for enabling the mobile node to pair with the network appliance;
 if the mobile node is paired with the network appliance, means for pushing an application from the mobile node to the network appliance; and
 means for enabling the mobile node to wirelessly communicate at least one management operation to the pushed application over a relatively short distance, wherein the management operation is provided to the network appliance for execution.

* * * * *

UNITED STATES PATENT AND TRADEMARK OFFICE
CERTIFICATE OF CORRECTION

| | | |
|---|---|---|
| PATENT NO. | : 6,985,697 B2 | Page 1 of 1 |
| APPLICATION NO. | : 10/668054 | |
| DATED | : January 10, 2006 | |
| INVENTOR(S) | : Gregory J. Smith et al. | |

It is certified that error appears in the above-identified patent and that said Letters Patent is hereby corrected as shown below:

Title page,
Item [75], Inventors, delete "Gregory J Smith, Santa Clara, CA (US)" and substitute -- Gregory J. Smith, Sanata Clara, CA (US) --.

Drawings,
Sheet 1 of 4 Cloud 140 (Fig. 1), Line 2, delete "NWTWORK" and insert -- NETWORK --.

Column 1,
Line 47, delete "EMBODIMENT" and insert -- EMBODIMENTS --.

Column 2,
Line 51, delete "low-power" and insert -- low power --.

Column 5,
Line 30, delete "computer readable" and insert -- computer-readable --.

Column 8,
Line 27, delete "computer readable" and insert -- computer-readable --.

Signed and Sealed this

Eleventh Day of July, 2006

JON W. DUDAS
*Director of the United States Patent and Trademark Office*